United States Patent [19]

Miyamoto et al.

[11] Patent Number: 4,858,879
[45] Date of Patent: Aug. 22, 1989

[54] MOUNT

[75] Inventors: Yasuo Miyamoto; Katsuyoshi Arai; Keiichi Uchiyama, all of Tochigi, Japan

[73] Assignee: Honda Giken Kogyo Kabushiki Kaisha, Tokyo, Japan

[21] Appl. No.: 215,660

[22] Filed: Jul. 6, 1988

[30] Foreign Application Priority Data

Jul. 7, 1987 [JP] Japan .................. 62-103328
Dec. 1, 1987 [JP] Japan .................. 62-184185

[51] Int. Cl.⁴ .......................................... F16F 13/00
[52] U.S. Cl. ................................ 248/562; 248/636; 267/140.1
[58] Field of Search ............... 248/562, 636, 638, 659; 267/140.1

[56] References Cited

U.S. PATENT DOCUMENTS

| 4,583,723 | 4/1986 | Ozawa | 248/562 X |
| 4,700,933 | 10/1987 | Chilcamori et al. | 248/636 X |
| 4,721,292 | 1/1988 | Saito | 248/562 X |
| 4,750,719 | 6/1988 | Hartel | 267/140.1 |
| 4,757,982 | 7/1988 | Andra et al. | 248/562 X |
| 4,767,106 | 8/1988 | Lefol | 267/140.1 |

FOREIGN PATENT DOCUMENTS

| 0133588 | 2/1985 | European Pat. Off. |
| 6039554 | 12/1981 | Japan . |
| 59-190530 | 10/1984 | Japan . |
| 59-231237 | 12/1984 | Japan . |
| 60-26828 | 2/1985 | Japan . |
| 60-34544 | 2/1985 | Japan . |
| 88833 | 4/1987 | Japan .................. 248/562 |
| 2153486A | 8/1985 | United Kingdom . |

Primary Examiner—Alvin C. Chin-Shue
Attorney, Agent, or Firm—Armstrong, Nikaido, Marmelstein, Kubovcik & Murray

[57] ABSTRACT

A combination viscous and resilient type of mount comprises a rigid boss adapted to be connected to a moving component such as an reciprocating engine, an annular flange adapted to be connected to a stationary support, a resilient element connected between the boss and the annular flange to resiliently supporting the moving component relative to the stationary support, the resilient element having a frustconical shape, a deformable element cooperating with the resilient element to define a chamber for viscous fluid, and a rigid partition connected to the flange and adapted to divide the fluid chamber into a working chamber and a compensation chamber, the partition including at least one orifice through which the two chambers are communicated with each other. A rigid spacer is interposed between the boss and a flange of the moving component and has an annular projection. A rigid ring is inserted into the resilient element and has an outwardly extending annular flange. When the boss moves downwards, the resilient element is pressed toward the partition upon contact of the projection of the spacer with the flange of the ring.

6 Claims, 2 Drawing Sheets

MOUNT

BACKGROUND OF THE INVENTION

1. Field of the Invention

This invention generally relates to mounts for movable machineries such as an reciprocating engine, and more particularly, to a combination viscous and resilient type of mount for damping or insulating vibrations.

2. Description of the Related Art

A wide variety of mounts have been proposed to resiliently support a moving machinery and prevent the vibration of the machinery being transmitted to another component.

European patent application No. 115,417 discloses a hydraulically damped mounting device where the damping is achieved at least partially by hydraulically. The disclosed mounting device typically includes two different anchor points joined by a resilient spring made of rubber. The resilient spring and a partition cooperate to form a working chamber for viscous fluid. The working chamber is communicated with a compensation chamber through a passage. The compensation chamber is bounded by a flexible bellow and is thus capable of expanding and contracting so as to compensate for the movement of the fluid between the two chambers. A flexible diaphragm is provided in a manner to directly contact the fluid in the working chamber and acts as a barrier between the fluid and a gas. Relative movement of the anchor points causes a change in pressure in the working chamber. High frequency vibrations are absorbed by movement of the diaphragm with little resistance, and low frequency vibrations cause fluid movement through the passage with a strong damping effect.

Upon application of a downward thrust to the resilient spring, it tends to be bent outwardly or expand due to its nature and shape. This tendency causes a reduction in the effective area of the piston or resilient spring. The reduction in the effective area of the spring results in a lesser damping effect.

There is another disadvantage to the prior art mounting device. Specifically, the resilient spring is subject to radiation heat or thermal effects by an engine and the like. The temperature of the fluid in the chambers will increase with increasing ambient temperature. Changes of the temperature in the fluid will affect the viscosity of the fluid and thus damping effects. The higher the temperature of the fluid, the weaker the damping effect.

SUMMARY OF THE INVENTION

It is a primary object of the present invention to provide an improved mount which ensures a sufficient damping effect.

It is another object of the invention to provide a mount which is prevented from radiation heat or thermal effects.

According to the invention, there is provided a mount comprising a rigid boss adapted to be connected to a moving component, an annular flange adapted to be connected to a stationary support, a resilient element connected between the boss and the annular flange, said resilient element having a frustconical shape, a deformable element cooperating with the resilient element to form a chamber for fluid, a rigid partition connected to the flange and adapted to divide the fluid chamber into a working chamber and a compensation chamber, said partition including at least one orifice through which said two chambers are communicated with each other, and means for pressing the resilient element toward the partition when the boss moves downwards.

In a preferred embodiment of the invention, a rigid spacer is disposed between a flange of the moving component and the boss, and has an annular projection made of rubber or similar material. A rigid ring is inserted into the resilient element and has an outwardly extending flange covered by rubber or similar material. When the boss moves downwards, the projection of the spacer is brought into contact with the flange of the ring so as to press the resilient element toward the partition. This arrangement is capable of providing a larger effective area of the resilient element as a piston.

A cover is attached to the edge of the spacer in surrounding relation to the resilient element in order to prevent the resilient element from radiation heat or thermal effects, for example, by an engine.

A stopper is provided on the lower surface of the resilient element. Downward movement of the boss can be snubbed when the stopper is brought into contact with the upper surface of the partition. This prevents displacement of the moving component. Alternatively, the stopper may be provided on the upper surface of the partition.

BRIEF DESCRIPTION OF THE DRAWINGS

A better understanding of the invention may be had by reference to the following description when taken in conjunction with the accompanying drawings, in which.

DESCRIPTION OF THE PREFERRED EMBODIMENTS

Figure 1:
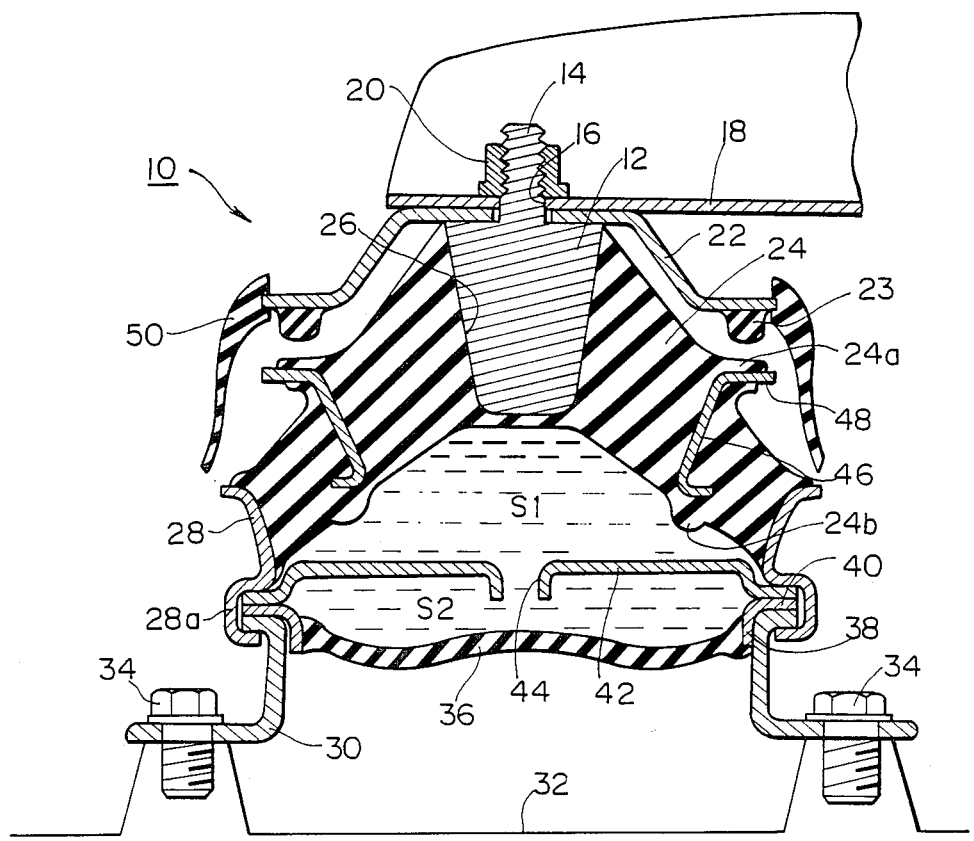
FIG. 1 is a vertical sectional view of a mount according to one embodiment of the present invention.

With now reference to FIG. 1, there is shown a mount constructed according to the teachings of the present invention and generally indicated at 10. This mount 10 includes a rigid boss 12 having an integral bolt 14 which passes through a hole 16 in a bracket 18 and is held by a nut 20. The bracket 18 is, in turn, fixed to any moving machinery such as a motor vehicle engine. Disposed between the bracket 18 and the boss 12 is a spacer 22 which will later be explained in detail. A resilient element or spring 24, made of rubber or similar material, is frustconical in shape and has a central recess 26 within which the boss 12 is received. A generally annular flange 28 is bonded or otherwise secured to the side wall of the resilient element 24 and extends over the rim of a stationary support 30 so as to attach the resilient element 24 to the stationary support 30. The stationary support 30 is, in turn, secured to a vehicle frame 32 by bolts 34.

A deformable element 36, made of rubber or similar material, is attached to a ring 38 which has an outwardly extending flange 40 seated on the rim of the stationary support 30. The deformable element 36 and the resilient element 24 cooperate together to form a chamber which is filled with suitable viscous fluid such as oil. This chamber is divided into a working chamber S1 and a compensation chamber S2 by a transverse rigid partition 42, the edge of which being superposed on the flange 40 of the ring 38. The partition 42 has a suitable number of apertures or orifices 44 (only one is shown) through which the two chambers S1 and S2 are communicated with each other. The flange 28 has an enlarged edge 28a which sealingly holds the annular edges of the partition 42 and the ring 38 together. The orifices 44 are suitably sized to obtain damping to a desired degree. It will be appreciated to one skilled in the art that the damping effect can also be controlled by the viscosity of the fluid.

When oscillations are transmitted to the boss 12 through the fixing bolt 14, the boss 12 moves toward and away from the stationary support 30. This vertical movement of the boss 12 causes the resilient element 24 to flex. The flexing of the resilient element 24 then displaces the fluid from the working chamber S1 to the compensation chamber S2 through the orifices 44 and vice versa. To this end, the compensation chamber S2 is capable of expanding and contracting by deformation of the element 36 to compensate for such movement of the fluid. The resistance to movement of the fluid through the orifices 44 imposes a drag on the flexing or movement of the resilient element 24. This quickly dampens out the action of the mount 10.

It will be noted that the greater the effective area of a piston, the stronger the damping effect. The resilient element 24 acts as such piston in this instance. As the element 24 is resilient in nature and frustoconical in shape, it tends to be bent outwards or expand when the boss 12 moves downwards. This results in a reduction in the effective area of the resilient element 24. In the illustrated embodiment, the spacer 22 includes an annular projection 23 for contact with a flange 24a of the resilient element 24. An annular metal ring 46 is inserted into the resilient element 24 and has a flange 48 extending into the rubber flange 24a. Upon downward movement of the boss 12, the projection 23 is brought into contact with the flange 24a of the resilient element 24 to press the resilient element 24 toward the partition 42. This prevents the resilient element 24 to expand and thus, increases the effective area of the piston or element 24.

The mount 10, particularly when used as an engine mount, is subject to significant fluctuations in ambient temperature. Changes in temperature will cause a change in the characteristics of the mount 10. In the illustrated embodiment, a cover 50 depends from the edge of the flange 48 spacer 22 and substantially surrounds the resilient element 24. The cover 50 effectively prevents damage to the resilient element 24 due to radiation heat or thermal effects by the engine, which would, otherwise, have a detrimental effect on the action of the mount 10. Such thermal effects also result in an increase in the volume of the working chamber S1 as well as the temperature of the fluid. Increase in the temperature of the fluid results in an decrease in the viscosity of the fluid, and this causes lesser damping effects. Conveniently, attachment of dust to the flange 24a is also prevented by this cover 50. The projection 23 is, otherwise, subject to wear when it is brought into contact with the flange 24a of the resilient element 24.

An annular stopper 24b is integrally formed on the lower surface of the resilient element 24. Upon contact of the stopper 24b with the upper surface of the partition 42, downward movement of the boss 12 can be snubbed, and excessive oscillation of the mount 10 is prevented.

Figure 2:
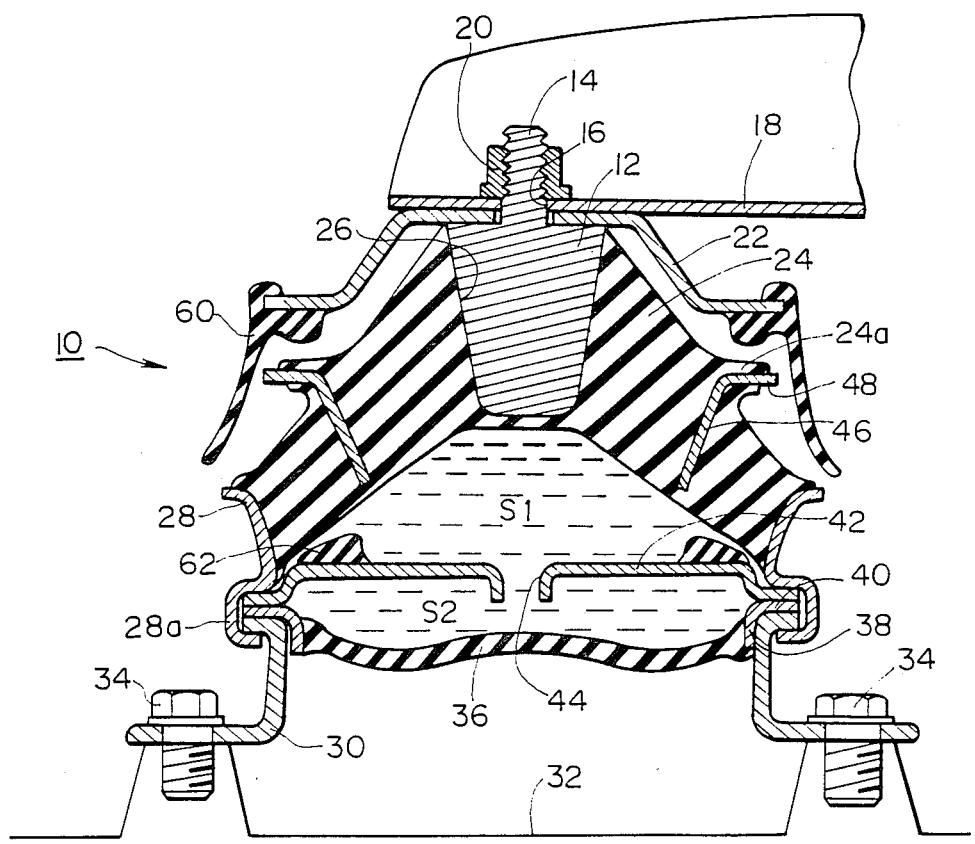
FIG. 2 is a view similar to FIG. 1, but showing a modified form of the invention.

FIG. 2 shows a modification of the mount shown in FIG. 1. Components of the mount similar to those of the mount shown in FIG. 1 are designated by the same reference numerals and will not be described further. In this modification, a cover and a projection are formed in an integral fashion as at 60, and a stopper 62 is provided on the upper surface of the partition 42.

Although various preferred embodiments of the instant invention have been described herein, it will be appreciated by those skilled in the art that variations or modification may be made thereto without departing from the spirit or the scope of the appended claims.

What is claimed is:

1. A mount comprising:
   a rigid boss adapted to be connected to a moving component;
   an annular flange adapted to be connected to a stationary support;
   a resilient element connected between said boss and said annular flange to resiliently support said moving component relative to said stationary support, said resilient element having a frustoconical shape;
   a deformable element cooperating with said resilient element to define a chamber, said chamber being filled with fluid;
   a rigid partition connected to said flange and adapted to divide said chamber into a working chamber and a compensation chamber, said partition including at least one orifice which said two chambers are communicated with each other; and
   pressing means including a rigid spacer connected to said boss and having an annular projection spaced above the intermediate portion of the resilient element, and a rigid ring inserted into the intermediate portion of said resilient element and having an outwardly extending annular flange opposing said annular projection said projection engaging the intermediate portion at said annular flange, when said boss moves downwards, thereby pressing said resilient element towards said partition.

2. A mount according to claim 1, wherein said annular projection is made of resilient material, and the flange of the ring is covered by resilient material.

3. A mount according to claim 1, wherein the spacer has an annular edge and a cover depends from the annular edge of the spacer and surrounds said resilient element.

4. A mount according to claim 3, wherein said cover and said annular projection are integrally formed.

5. A mount according to claim 1, wherein said resilient element has a stopper on its lower surface.

6. A mount according to claim 1, wherein said partition has a stopper on its upper surface.

* * * * *